Jan. 21, 1958 A. A. ANDERSON 2,820,620
APPARATUS AND PROCESS FOR HEATING LIQUIDS
Filed July 22, 1954 2 Sheets-Sheet 2
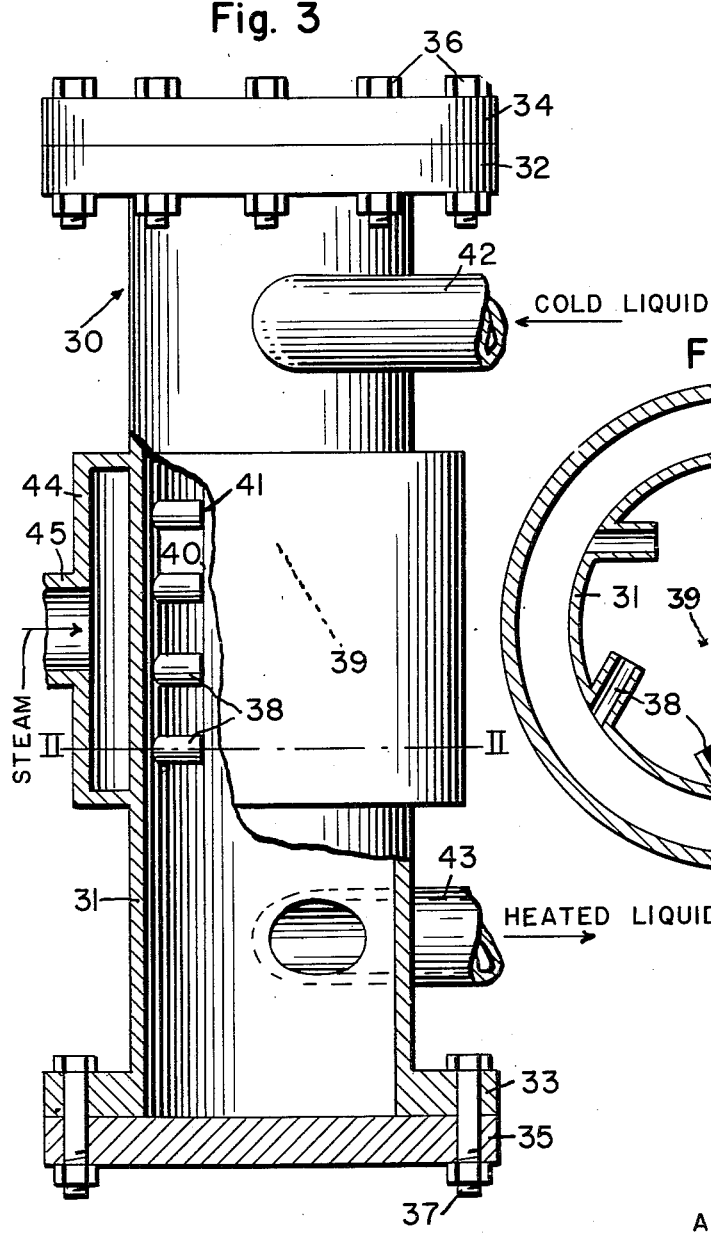
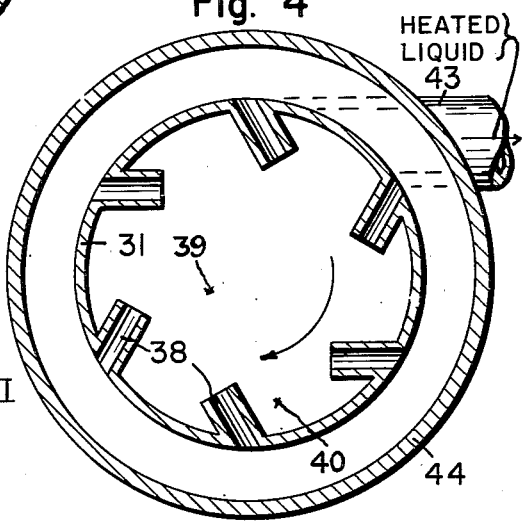
INVENTOR.
ARVID A. ANDERSON
BY
James E. Toomey
ATTORNEY

United States Patent Office 2,820,620
Patented Jan. 21, 1958

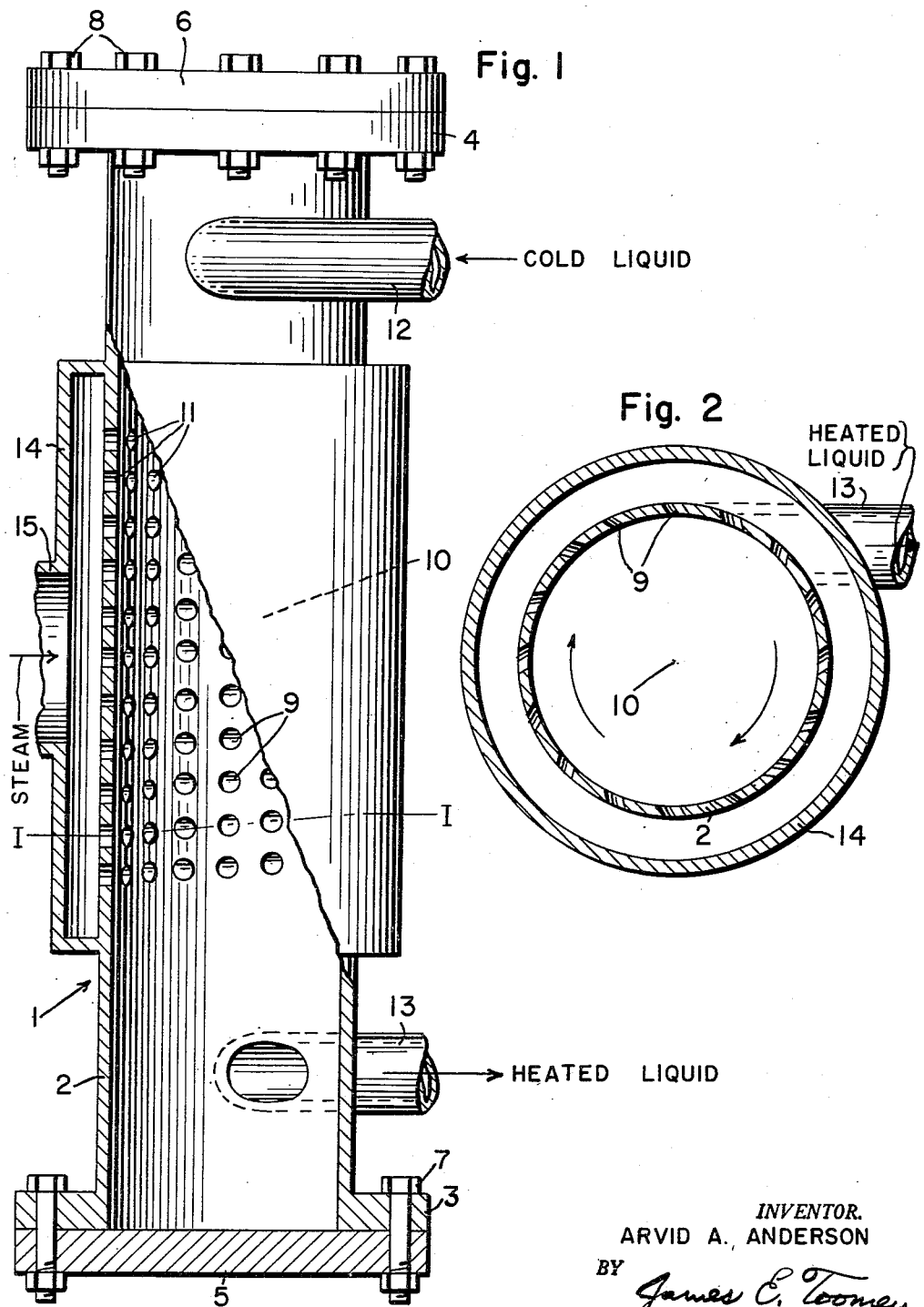

2,820,620
APPARATUS AND PROCESS FOR HEATING LIQUIDS

Arvid A. Anderson, Baton Rouge, La., assignor to Kaiser Aluminum & Chemical Corporation, Oakland, Calif., a corporation of Delaware Application July 22, 1954, Serial No. 445,107

10 Claims. (Cl. 261—124)

The herein described invention relates to a method and apparatus for heating liquids by the injection of steam or other high temperature gaseous media therein.

There are many difficulties which attend the heating of liquids by the direct injection of steam, many of the difficulties being as yet unsolved. For example, apparatus heretofore designed and employed for heating liquids by the direct injection of steam are usually restricted to close ranges of operation in order to avoid the annoying and dangerous vibrations commonly termed "steam" or "water hammer." In general, the "steam" or "water hammer," which hereafter will be referred to as "water hammer," is caused by the rapid collapse of the steam and is aggravated by high temperature differentials between the steam and the liquid undergoing a temperature rise. One method for decreasing the temperature rise in methods employed for heating liquids by the direct injection of live steam therein is to recycle a portion of the heated liquid so as to produce an overall higher temperature of the liquid undergoing heat treatment. This method also serves to reduce the difference between the vapor pressure and the steam pressure, a relationship which materially affects the presence or absence of water hammer. This method for reducing or minimizing the water hammer under extreme operating conditions, of course, decreases the capacity of the live steam injection unit employed and naturally is to be avoided for greater steam injection efficiency. Consequently, there is a demand for a method of employing the direct injection of live steam which will accomplish the heat transfer from the steam to the liquid over a wide range of varying operating conditions without the accompaniment of the dangerous shocks attributed to the collapse of the steam during the process of heating.

According to the invention, the water hammer may be substantially minimized by injecting the live steam as a plurality of small gaseous streams into the liquid under conditions of high turbulence and extreme shear stresses such as are found in the peripheral regions of a body of liquid undergoing high centrifugal forces. Accordingly, it has been found that it is highly advantageous in the art of heating liquids by the direct injection of live steam to maintain a liquid heating zone which is relatively elongated and within which the liquid undergoing heat treatment is rapidly rotating about the axis thereof. The rapid rotation may be caused in substantial amounts as by means of feeding the cold liquid tangentially thereto at one end thereof and from the other end of which the liquid is discharged preferably, although not limited hereto, by tangential discharge means. The steam is injected into the peripheral regions of high turbulence and great shear stresses as a plurality of gaseous streams as by means of a multiplicity of orifices located about the periphery of the heating zone. Apparently, the mixing conditions are greatest at the periphery of the rapidly rotating body of liquid and accordingly, the steam thus injected as a plurality of gaseous streams is quickly swept away from the orifices in the form of exceptionally small bubbles which do not tend to coalesce as a result. Because of the centrifugal forces and the greater density of the liquid elements present at the periphery of the heating zone as compared to the density of the steam, the steam, once inserted, tends to migrate inwardly toward the axis of rotation of the body. Likewise, the centrifugal forces apparently tend to facilitate a greater mixing of the overall liquid within the body by reason of the fact that the liquid elements which are heated at the periphery thereby have a lower density than colder elements and consequently, the former elements tend to migrate toward the axis of rotation. Thus, the injection of the steam through a plurality of orifices at the periphery of a body of liquid undergoing a temperature rise and which is rapidly rotating about the axis thereof has certain features which give rise to rapid transfer of the heat content of the steam to the liquid without the accompaniment of extreme water hammer.

It has been found preferable to insert the first elements of steam from the periphery into the rapidly rotating body of liquid in the heating zone at a point relatively removed from the point of tangential delivery of the cold liquid to the heating zone in order for initial mixing of the hot and cold liquids to take place therein. This permits an initial temperature rise of the liquid prior to first contacting the steam and affords more favorable conditions at the first point of steam insertion for preventing the rapid collapse of steam. Likewise, it has been found most advantageous to realize the full benefits of the invention to employ a relatively elongated heating zone to accomplish the insertion of the steam as a plurality of gaseous streams into the liquid body in a smooth manner relatively removed longitudinally from the peripheral point of insertion of the cold liquid and for maintaining adequate mixing conditions in the heating zone.

Accordingly, it is an object of the herein described invention to provide a process for heating liquids by the direct injection of live steam therein. It is, furthermore, an object of the invention to provide a process for heating liquids which may be utilized over wide ranges of operating conditions as regards heat input and quantities of liquids treated. It is a further object to provide a process for heating liquids over wide ranges of operating conditions whereby the water hammer which normally accompanies the most extreme operating conditions is appreciably minimized. It is another object to provide apparatus for treating liquids. It is still a further object to provide apparatus which may be advantageously employed for heat transfer purposes. It is still a further object to provide a simple apparatus for the injection of steam into liquids whereby the wide ranges of operating conditions may be easily employed with a minimum of water hammer. Other and further objects will be apparent from the disclosure herein.

According to the invention a rapidly rotating relatively elongated body of liquid is maintained in a heating zone by tangentially feeding the cold liquid thereto, and the steam is injected as a plurality of gaseous streams discharging from orifices therein from the periphery of the zone. The direction of the steam insertion may also and is preferably employed to augment the centrifugal motion of the liquid in the heating zone.

The scope of the invention is not to be limited by the particular direction at which the steam is inserted into the liquid but rather the steam may be directed radially into the rapidly rotating body of liquid or may be directed against the flow of the liquid or in a manner such as to augment the flow of the liquid about the axis of the heating zone. Nevertheless, it has been found most advantageous to inject the steam from the periphery into the heating zone in a manner such as to impart energy thereto to augment the centrifuging effect accomplished by the initial delivery of the cold liquid to the elongated heating zone in a tangential manner. In this regard, it has also been found that it is preferable to employ orifices at the periphery of the heating zone which direct the steam thereto at an angle with a radius thereof less than about 45°. It has been found that when the orifices are mere holes through the shell of the apparatus defining the heating zone and the angle of the steam injection is much greater than 45° a cavitation phenomenon takes place around the inside periphery of the shell, a situation which, of course, is undesirable from an equipment standpoint of view. Likewise, in order to avoid this cavitation phenomenon, it has been found advantageous to employ nozzles or protractions which facilitate injecting the steam at a point somewhat removed from the shell of the apparatus employed for defining the heating zone. It may be mentioned also at this point that when the liquid undergoing live steam injection is a slurry containing solid matter, as is apparent to those skilled in the art from the centrifugal action which takes place in the apparatus, that the orifices employed should be directed at an angle with respect to the radius of the heating zone so as to prevent the solid matter from plugging the orifices.

Fig. I is a partially sectional fragmental view of an apparatus employing the principal concept of the herein described method for heating liquids. Fig. II is a sectional view thereof taken along the lines I—I of Fig. I. Fig. III is a partially sectional fragmental view of another apparatus employing the concept of the invention and shows the orifices in the form of protrusions which extend into the heating zone so as to prevent cavitation about the inside periphery of the shell. Fig. IV is a sectional view of the apparatus shown in Fig. III taken along the lines II—II.

With particular reference to the apparatus shown in Fig. I and Fig. II the live steam heater 1 comprises a shell 2 having flange portions 3 and 4 at either end thereof to which are attached blind flanges 5 and 6, respectively, and secured thereto by means of bolts 7 and 8, respectively. Shell 2 has a plurality of passageways or holes 9 forming orifices for the injection of steam into the heating zone 10. Disposed relatively removed from the first holes 11 contacted by the cold liquid feed to the heating zone 10 and relatively at one end of the heating zone 10 is tangential feed pipe 12. At the other end of the heating zone 10 and disposed tangentially in shell 2 to minimize the pressure drop across the vessel and to most easily facilitate removal of the heated liquid is discharge pipe 13. Disposed about the periphery of shell 2 in close proximity to the holes 9 employed for inserting steam into heating zone 10 is steam jacket 14 which is fed steam from an outside source by means of pipe 15.

In operation, the cold liquid enters the heating zone 10 tangentially through feed pipe 12, and because of the tangential feed rapidly rotates about the longitudinal axis of shell 2 within the heating zone 10 and is discharged from the heating zone through tangentially located discharge pipe 13. During the residence time in the heating zone 10 of the heater 1, steam is fed through pipe 15 to steam jacket 14 by means of which the steam is distributed to the holes 9 located about the periphery of the shell 2 and through which the steam enters the heating zone 10 to condense in the liquid therein.

The orifices defined by holes 9 are placed at an angle with respect to the radius of shell 2 so that the jetting action of the steam augments the rotation of the liquid in the direction of the arrows shown in Fig. II in the heating zone 10 and to thereby impart an additional centrifugal force thereto beyond that obtained by the tangential feed of the cold liquid through feed pipe 12. As previously mentioned, the angle of the holes with respect to the radius should be less than about 45° so as to prevent cavitation and erosion around the inside wall of the shell 2.

The size of the holes 9 through which the steam is injected into the heating zone 10 should be less than about ¼ of an inch in diameter when the apparatus is being operated in the preferred peripheral centrifugal force range of between about 300 to 1000 ft. sec.$^{-2}$. Thus, it has been determined that a most effective range of operation for elimination of the water hammer is when a centrifugal force is developed at the periphery of the heating zone of between about 300 and 1000 ft. sec.$^{-2}$ and when the size of the holes through which the steam is inserted are less than about ¼ of an inch. Apparently, the centrifugal forces developed over this range of operation are such as to adequately disperse the steam inserted and to facilitate substantial elimination of water hammer when the orifice sizes employed are adequately small enough to present steam particles having sufficient interfacial surface area for rapid transfer of the heat content of the steam to the liquid without the extremely aggravated impulsive violence associated with conditions wherein coalescense of steam is permitted or large quantities of steam are inserted under less drastic mixing conditions. Adequate results under these centrifugal force conditions have been obtained by employment of an orifice size of about 3/16 of an inch, orifice sizes less than about 1/16 of an inch not having been found to be of practical material benefit over orifices of about 3/16 of an inch in diameter. It is preferred to evenly distribute these orifices over the peripheral area wherefrom the steam is inserted so that the rate of steam injection is from 5000 to 15,000 pounds per hour per square foot of said peripheral area.

In line also with obtaining the widest range of operating conditions, it has been determined that the most effective transfer of the heat content of the steam to the liquid under these heretofore mentioned operating conditions without the accompaniment of extreme amounts of water hammer is obtained when carried out with an overpressure ratio of vapor pressure of heated liquid at the discharge of the apparatus to the hydraulic pressure on the liquid in the apparatus of between about .85 and .95, although operations have been successfully carried out at overpressure ratios as low as .60.

Referring particularly to Fig. III and Fig. IV, 30 depicts a heater employing the basic concept of the herein described invention and wherein the steam is inserted into the heating zone at a point removed relatively from the periphery of the heating zone so as to accomplish substantially the same result without obtaining cavitation under the operating conditions heretofore indicated. The heater comprises a shell 31 having flange portions 32 and 33 at either end thereof to which are attached blind flange portions 34 and 35, respectively, by means of bolts 36 and 37, respectively. Shell 31 has a plurality of nozzles 38 forming passageways through which the steam is injected into heating zone 39. The nozzles 38 which act as orifices provide passageways for the steam so that it is discharged in heating zone 39 at a point such as 40 which is relatively removed from the inside wall of the shell 31. Disposed relatively removed from the first nozzles 41 contacted by the cold liquid fed to the heating zone 39 and relatively at one end of the heating zone 39 is tangential feed pipe 42. At the other end of the heating zone 39 and likewise, disposed tangentially in the shell 31 to minimize the pressure drop across the vessel is discharge pipe 43. Disposed about the periphery of the shell 31 in close proximity to the passageways formed by nozzles 38 is steam jacket 44 which is fed steam from an outside source by means of pipe 45.

In operation, the cold liquid enters the heating zone 39 tangentially through feed pipe 42 and rapidly rotates about the longitudinal axis of shell 31 within the heating zone 39 from whence it is discharged through tangential discharge pipe 43. Simultaneously, steam through pipe 45 is conveyed to steam jacket 44 which distributes steam to the nozzles 38 and through which the steam is conveyed to a point 40 relatively removed from the inner wall of shell 31 defining heating zone 39. As is apparent from Fig. IV nozzles 38 are placed at an angle with respect to the radius of the shell 31 in the direction of the rotation of the liquid which is initially caused by the tangential feed thereof to the vessel as by means of pipe 42. In this manner the jets of steam enhance the centrifugal motion and aid obtainment of the beneficial results caused thereby.

The operating conditions heretofore indicated are applicable to the apparatus depicted in Fig. III and Fig. IV also. By using extended nozzles 38 as shown, it is possible to substantially enlarge the steam passageways over that previously cited. By way of an example, it may be stated that a nozzle diameter of ⅜ inch may be employed if said nozzle is extended into the mass of rapidly rotating liquid away at a point substantially away from the periphery of the vessel, and still avoid the objectionable steam cavitation phenomena previously referred to.

Although no formulae have been determined to ascertaining the distance from the periphery of the vessel for the insertion of the steam, it may be stated in general that this distance must be increased as the nozzle diameter is made larger, and also to compensate for higher centrifugal forces. In any event, this can be determined rather easily by those skilled in the art having regard for the particular liquid being treated, the centrifugal forces to be developed and the other operating conditions such as the steam injection requirements.

It is apparent from the disclosure herein given that the method of heating may be carried out in apparatus employing different features than herein described and accordingly, the method of heating is not to be construed as limited except as set forth in the claims. The apparatus set forth in Figs. I through IV have been found to have utility with regard to other operations than heating such as mixing operations and accordingly, the claims directed thereto are not to be limited except in so far as expressly stated therein.

What is claimed is:

1. Apparatus comprising a closed substantially cylindrical vessel, containing a substantially unobstructed inner zone, the length of which is greater than its diameter, inlet conduit means disposed substantially tangential to the diametric periphery and relatively at one end of said vessel, outlet conduit means disposed relative to the other end of said vessel, a multitude of passageways communicating within said vessel through the wall thereof disposed between said inlet and outlet conduit means, said passageways being angularly disposed through the wall of said vessel such that fluid passing through the passageways will enter the vessel in a substantially tangential manner, and header means disposed at the outer periphery of said vessel in the area of said passageways for commonly feeding said passageways.

2. Apparatus comprising a closed substantially cylindrical vessel, containing a substantially unobstructed inner zone, the length of which is greater than its diameter, inlet conduit means disposed substantially tangential to the diametric periphery and relatively at one end of said vessel, outlet conduit means disposed relatively at the other end of said vessel, a multitude of passageways communicating within said vessel through the wall thereof disposed between said inlet and outlet conduit means, said passageways being angularly disposed through the wall of said vessel such that fluid passing through the passageways will enter the vessel at the inner periphery thereof in a substantially tangential manner, and header means disposed at the outer periphery of said vessel in the area of said passageways for commonly feeding said passageways.

3. Apparatus comprising a closed substantially cylindrical vessel, containing a substantially unobstructed inner zone, the length of which is greater than its diameter, inlet conduit means disposed substantially tangential to the diametric periphery and relatively at one end of said vessel, outlet conduit means disposed relatively at the other end of said vessel, a multitude of passageways communicating within said vessel through the wall thereof disposed between said inlet and outlet conduit means, said passageways being angularly disposed through the wall of said vessel such that fluid passing through the passageways will enter the vessel at points removed from said wall of said vessel and in a substantially tangential manner, and header means disposed at the outer periphery of said vessel in the area of said passageways for commonly feeding said passageways.

4. Apparatus for heating a liquid by the injection of live steam therein comprising a closed substantially cylindrical vessel, containing a substantially unobstructed inner zone, the length of which is greater than its diameter, means at one end of said vessel for feeding said liquid tangentially thereto, means at the other end of said vessel for discharging said liquid therefrom, means for injecting said steam into said vessel through the wall thereof as a multitude of gaseous streams discharging tangentially therein at the inner periphery of said vessel between said liquid feeding and discharging means, and header means for commonly feeding steam to said latter means, disposed at the outer periphery of said vessel.

5. Apparatus for heating a liquid by the injection of live steam comprising a closed substantially cylindrical vessel, containing a substantially unobstructed inner zone, the length of which is greater than its diameter, means relatively at one end of said vessel for feeding said liquid tangentially thereto, means at the other end of said vessel for discharging said liquid therefrom, a multitude of passageways communicating within said vessel through the wall thereof to a point relatively removed from said inner wall of said vessel and between said feeding and discharging means, said passageways being angularly disposed through the wall of said vessel such that steam passing through the passageways will enter the vessel at points removed from said wall of said vessel in a substantially tangential manner, and header means disposed at the outer periphery of said vessel in the area of said passageways for commonly feeding steam to said passageways.

6. Apparatus for heating a liquid by injection of live steam comprising a closed substantially cylindrical vessel, containing a substantially unobstructed inner zone, the length of which is greater than its diameter, means relatively at one end of said vessel for feeding said liquid tangentially thereto, means at the other end of said vessel for discharging said liquid in a substantially tangential manner therefrom, a multitude of passageways communicating within said vessel through the wall thereof disposed between said feeding and discharge means, said passageways being angularly disposed through the wall of said vessel at an angle less than 45° with respect to the radius of said vessel such that fluid passing through the passageways will enter the vessel in a substantially tangential manner, and header means disposed at the outer periphery of said vessel in the area of said passageways for feeding said passageways.

7. The apparatus of claim 6 wherein said passageways are holes in the wall of said vessel.

8. The apparatus of claim 6 wherein said passageways comprise nozzle means through the wall of said vessel which terminate at points removed from said wall of said vessel and such that fluid passing through said nozzles is discharged in a substantially tangential manner at a point removed from the inner wall of said vessel.

9. The process for continually heating a liquid by condensing gaseous media therein comprising feeding said liquid tangentially to and relatively at one end of a confined, unobstructed, elongated heating zone, to rapidly rotate said liquid about the axis thereof with a resultant formation of vortex flow, discharging said liquid from the other end of said zone and injecting said gaseous media at the periphery of said zone between said tangential feed and said discharge as a multitude of gaseous streams which enter said liquid at an angle with respect to the radius of said zone and in a manner which augments the rotational flow of said liquid in said zone, said gaseous streams discharging within and at points removed from said wall of said zone.

10. A process for continually heating a liquid by condensing steam therein, comprising feeding said liquid tangentially to and relatively at one end of a confined, unobstructed elongated heating zone, to rapidly rotate said liquid about the axis thereof with a resultant formation of vortex flow, discharging said liquid from the other end of said zone, and injecting said steam at the periphery of said zone between said tangential feed and said discharge, as a multitude of gaseous streams which enter the said liquid at an angle of less than 45° with respect to the radius of said zone and in a manner which augments the rotational flow of said fluid in said zone, said gaseous streams being discharged through a multitude of orifices having diameters less than about ¼ inch and whereby said introduction of gaseous streams develops a centrifugal force of the liquid at the periphery thereof between 300 and 1000 ft. sec.$^{-2}$, said steam being injected in amounts to maintain an overpressure ratio of vapor pressure of heated liquid to hydraulic pressure of between about .60 and .95.

References Cited in the file of this patent

UNITED STATES PATENTS

| | | |
|---|---|---|
| 145,538 | Stoddart | Dec. 16, 1873 |
| 613,093 | Tyson | Oct. 25, 1898 |
| 2,452,260 | Peebles | Oct. 26, 1948 |
| 2,455,498 | Kern | Dec. 7, 1948 |
| 2,545,028 | Haldeman | Mar. 31, 1951 |

FOREIGN PATENTS

| | | |
|---|---|---|
| 403,080 | Great Britain | Dec. 7, 1933 |
| 1,040,298 | France | May 20, 1953 |